United States Patent Office 3,531,450
Patented Sept. 29, 1970

3,531,450
THREE COMPONENT HYDROGENATION CATA-
LYSTS AND A PROCESS FOR HYDROGENATING
POLYMERS BY THE USE OF THEM
Toshio Yoshimoto, Kodaira, Tokyo, Seiya Kaneko, Musa-
shino, Tokyo, Tsuneaki Narumiya, Kodaira, Tokyo,
and Hiroshi Yoshii, Higashi-Murayama, Tokyo, Japan,
assignors to Bridgestone Tire Company Limited, Tokyo,
Japan
No Drawing. Filed Oct. 23, 1967, Ser. No. 677,054
Claims priority, application Japan, Oct. 31, 1966,
41/71,349; July 20, 1967, 42/46,302
Int. Cl. C08d 5/00; C08f 1/88, 27/25
U.S. Cl. 260—85.1                                    25 Claims

ABSTRACT OF THE DISCLOSURE

Catalytic hydrogenation of the hydrogenatable unsaturated bonds of polymer in a viscous solution form with hydrogen by using a three component catalyst consisting of
(1) at least one kind of an unsaturated hydrocarbon selected from the group consisting of an olefinically unsaturated, hydrocarbon and an acetylenically unsaturated hydrocarbon,
(2) at least one kind of an organic compound of the metal selected from the group consisting of nickel, cobalt and iron and
(3) at least one kind of a metal compound reducing agent.

The present invention relates to a new hydrogenation catalyst consisting of three catalytic components and a process for hydrogenating polymers by the use of said catalyst.

In order to hydrogenate unsaturated bond of polymers efficiently by the use of an ordinary heterogeneous reduced metal catalysts such as Raney nickel and nickel kieselguhr, it is necessary to use a large amount of catalysts, a high reaction temperature of from 150° to 200° C. or higher and a high hydrogen pressure, because a solution of polymers is highly viscous compared with that of low molecular weight monomers. Such a process has a further disadvantage wherein these high temperature hydrogenation conditions cause the degradation of the polymers. Further, these heterogeneous catalysts are not suitable for hydrogenation of polymers, because they are easily poisoned by impurities which are difficult to be removed from and further it is very difficult to remove such a heterogeneous catalyst residue from hydrogenated polymers.

It is an object of this invention, therefore, to provide a new, stable catalyst having unusual high activity suitable for the hydrogenation of polymers in a viscous solution form.

Another object of the invention is to provide a new process for hydrogenating polymers in a viscous solution form.

A further object of the invention is to provide new hydrogenated polymers suitable for manufacturing the rubber articles.

Other and further objects of the invention will become apparent to those skilled in the art upon consideration of the accompanying disclosure.

We have found that an extremely small amount of soluble catalyst consisting of (1) an olefinically or acetylenically unsaturated hydrocarbon, (2) an organic compound of nickel, cobalt or iron and (3) a metal compound reducing agent can effect the hydrogenation of polymers in a viscous solution form partially or completely under a mild condition, for example, at near room temperature and under atmospheric pressure of hydrogen, and that the three components catalyst of the present invention is stable for a long time and easily removed from the hydrogenated polymers.

The present invention provides a process for the catalytic hydrogenation of polymers, which comprises reacting the hydrogenatable unsaturated bonds of the polymers in a viscous solution form with hydrogen by the use of a three components catalyst consisting of (1) an unsaturated hydrocarbon selected from the group consisting of an olefinically unsaturated hydrocarbon and an acetylenically unsaturated hydrocarbon, (2) an organic compound of the metal selected from the group consisting of nickel, cobalt and iron and (3) a metal compound reducing agent.

The catalyst used in the process of the present invention is soluble in a viscous solution of the polymers to be hydrogenated and is stable for a long period of time at such a high temperature that the viscosity of the polymer solution decreases and further that the thermal degradation of the polymer does not occur substantially. Moreover the catalyst can effect a selective hydrogenation of olefinic unsaturations under a mild condition. The process of the present invention is therefore suitable for the selective hydrogenation of the olefinically unsaturated bonds of the polymers and further is preferably utilized in a continuous hydrogenation process.

The first component of the catalyst is an unsaturated hydrocarbon having at least one olefinically or acetylenically unsaturated bond. The unsaturated hydrocarbons include monoolefins, diolefins, polyolefins, cycloolefins, acetylenes, unsaturated hydrocarbons having more than one kind of unsaturated bonds described above and their mixtures. Unsaturated hydrocarbons having at least one carbon-carbon unsaturated bond per 10 carbon atoms of the molecule are preferred in the present invention. Hydrocarbons which have only aromatic nuclei and have no olefinically or acetylenically unsaturated bond are not included in the catalytic component of the present invention.

Examples of monoolefins include ethylene, propylene, cis-2-butene, trans-2-butene, 2-methylbutene-1, 2-methylbutene-2, 1-pentene, 2-pentene, 1-hexene, 1-heptene, 1-octene, isooctene, styrene, vinyltolene and the like. Monoolefins having more than 10 carbon atoms tend to form a less active hydrogenation catalyst. Examples of diolefins include 1,3-butadiene, isoprene, 1,3-pentadiene, 1,7-octadiene and the like. Examples of cycloolefins include cyclohexene, 4-methylcyclohexene, cyclooctene, 1,5-cyclooctadiene, cyclopentadiene, dicyclopentadiene, cyclododecatriene and the like.

Examples of acetylenes include acetylene, methylacetylene, ethylacetylene, phenylacetylene and the like.

Examples of unsaturated hydrocarbons having more than one kinds of unsaturated bonds include 4-vinylcychlohexene-1, vinylacetylene, divinylacetylene and the like.

Mixtures of any of above described olefinically or acetylenically unsaturated hydrocarbons may be used.

The gaseous unsaturated hydrocarbon is used as the solution of an inert solvent and the solution is preferably dehydrated before use.

The second component of the catalyst is an organic compound of the transition metal such as nickel, cobalt or iron. The organic compounds of which organic radicals are attached to the metal through oxygen are preferably used. Among those one of preferable compounds is a metal carboxylate having the formula $(R'COO)_n{}'M'$, wherein $M'$ is a metal selected from the group consisting of nickel, cobalt and iron, $R'$ is a hydrocarbon radical having 1 to 50 carbon atoms, preferably from 5 to 30 carbon atoms and $n'$ is a valence number of $M'$. These metal carboxylates include nickel, cobalt and iron salts of hydrocarbon aliphatic acid, hydrocarbon aromatic acid and hydrocarbon cycloaliphatic acid. Examples of hydrocarbon aliphatic acids include a hexanoic acid, a heptanoic acid, an octanoic acid, a nonanoic acid, a decanoic acid, a dodecanoic acid, a myristic acid, a palmitic acid, a stearic acid, a dodecenoic acid, an oleic acid, a linoleic acid, a rhodic acid and the like. Examples of hydrocarbon aromatic acid include benzoic acid and alkyl-substituted aromatic acids in which alkyl has from 1 to 20 carbon atoms. These include t-butyl, 2-ethylhexyl-, dodecyl-, and nonylbenzoic acids and the like. Examples of cycloaliphatic acids include naphthenic acid, cyclohexylcarboxylic acid, abietic type resin acid and the like. Commercially available metallic soaps such as naphthenic acid salts, resin acid salts, linoleic acid salts, oleic acid salts, stearic acid salts and tall oil salts may be used.

Other preferable organic compounds are metal chelate compounds. As the chelating groups which can chelate with the metal such as nickel, cobalt or iron, β-ketones, α-hydroxycarboxylic acids, β-hydroxycarboxylic acid and β-hydroxycarbonyl compounds may be used. Examples of the β-ketones include acetylacetone, 1,3-hexanedione, 3,5-nonandione, methyl acetoacetate, ethyl acetoacetate and the like. Examples of the α-hydroxycarboxylic acids include lactic acid, glycolic acid, α-hydroxyphenylacetic acid, α-hydroxy-α-phenylacetic acid, α-hydroxycyclohexylacetic acid and the like. Examples of the β-hydroxycarboxylic acids include salicyclic acid, alkyl-substituted salicyclic acid, and the like. Examples of the β-hydroxycarbonyl compounds include salicylaldehyde, o-hydroxyacetophenone and the like. Examples of the metal chelate compounds having above described chelating groups include bis(acetylacetone)nickel, tris(acetylacetone)cobalt, bis(ethyl acetoacetate)nickel, bis(ethyl acetoacetate)cobalt, bis(3,5-diisopropylsalicyclic acid)nickel, bis(salicylaldehyde)nickel, bis(salicylaldehyde)cobalt and the like.

In addition to the above described organic compounds, metal sulfonates may be used. Nickel, cobalt and iron salts of benzene sulfonic acid, p-toluene sulfonic acid and alkyl-benzene sulfonic acids such as dodecylbenzene sulfonic acid are preferably used.

To obtain the catalyst with unusual high activity characterizing the present invention, transition metal compounds dehydrated and soluble in an inert solvent are preferably used. A great number of transition metal compounds having different organic radicals as described above can be used in almost similar effectiveness as the catalytic component of the invention, when the kind of metal is same and the amount of metal used is same.

The third component of the catalyst is a metal compound reducing agent. An organometallic compound or a hydride of the metal of Group 1, 2 or 3 may be used. The organometallic compounds having the formula of $MR_n$, wherein M is a metal selected from the group consisting of lithium, magnesium and aluminium, R is selected from the group consisting of hydrocarbon radical having from 1 to 12 carbon atoms, hydrogen and an alkoxy radical having from 1 to 12 carbon atoms and $n$ is the valence number of M, are preferably used.

The hydrocarbon radical includes an alkyl, aryl, alkaryl, aralkyl and cycloaliphatic group. Examples of such radicals include methyl, ethyl, n-propyl, i-propyl, n-butyl, i-butyl, sec-butyl, t-butyl, pentyl, hexyl, heptyl, octyl, nonyl, decyl, dodecyl, phenyl, benzyl, tolyl, cyclopentyl, cyclohexyl, cyclohexenyl and naphthyl radicals. The group combined to oxygen in the alkoxy radical is exemplified as described above too.

Examples of such organometallic compounds include ethyllithium, n-propyllithium, n-butyllithium, i-butyllithium, sec-butyllithium, t-butyllithium, n-pentyllithium, phenyllithium, diethylmagnesium, di-n-propylmagnesium, di-n-butylmagnesium, diphenylmagnesium, triethylaluminium, tri-n-propylaluminimum, triisopropylaluminium, tri-n-butylaluminium, triisobutylaluminium, triamylaluminium, trihexylaluminimum, trioctylaluminimum, tridodecylaluminium, diethylisobutylaluminimum, diethyloctylaluminium, tricyclohexylaluminium, triphenylaluminium, didodecylaluminiumhydride, diisobutylaluminiumhydride, diethylaluminiumethoxide, dibutylaluminiumbuthoxide and their mixtures. In addition to the above mentioned compounds, the organometallic compounds and the metal hydrides having two kinds of metals such as lithiumaluminiumtetrabutyl, lithiumaluminiumhydride and sodiumborohydride may be used.

The catalyst of the present invention may be obtained by mixing three catalytic components hereinbefore mentioned under an inert atmosphere not containing hydrogen. When the catalyst is prepared in an atmosphere containing hydrogen, the obtained catalyst is unstable. The atmosphere of nitrogen, argon or helium is preferably used. When three components of the catalyst are mixed in an inert solvent, colour of the organic compound of nickel, cobalt or iron turns to brown or black and a new reaction complex is obtained and we have now found that this complex is an excellent hydrogenation catalyst. The reaction complex is soluble in a viscous polymer solution and can make most homogeneous contact with polymers and hydrogen and therefore the hydrogenation proceeds rapidly under a mild condition, for example, at near room temperature and under atmospheric pressure of hydrogen. Accordingly, the catalyst of the present invention is not deposited from the solution of the polymer to be hydrogenated containing the catalyst obtained by the procedure of the invention by ultracentrifugation. It is preferable to dilute the catalytic components in the catalyst preparation to avoid unusual elevation of temperature.

The mixing order of three catalytic components of the present invention is very important to obtain the catalyst with the highest activity. When the catalyst is prepared in an inert solvent at a temperature of from 0° to 100° C., an organic compound of nickel, cobalt or iron is preferably mixed with a metal compound reducing agent in the presence of a hydrocarbon having olefinically or acetylenically unsaturated bonds. The catalyst obtained by such mixing order has both high activity and high stability for a long period of time, even when the catalyst is prepared at a temperature as high as about 80° C. On the contrary, the catalyst having the highest activity can not be obtained by adding the olefinically or acetylenically unsaturated hydrocarbon to the product obtained by reacting the transition metal compound with the metal compound reducing agent at a high temperature. In this case, the catalytic activity decreases rapidly as the mixing temperature increases.

When the catalyst is prepared in an inert solvent at a temperature of from −100° to 0° C., the transition metal compound is preferably mixed with the metal compound reducing agent at a temperature of from −100° to 0° C. and then the obtained mixture is mixed with an olefinically or acetylenically unsaturated hydrocarbon at a temperature not higher than the temperature when the transition metal is mixed with the metal compound reducing agent. When the three catalytic components are mixed at the same time in this case, a long time is required for the formation of the catalyst although the obtained activity of the catalyst is almost same.

The applicant has proposed that the reaction product obtained by mixing the transition metal compound and the metal compound reducing agent in the absence of the unsaturated hydrocarbon may be used as the hydrogenation catalyst too, if the reaction condition of the catalyst preparation is limited. But the activity and stability are considerably inferior to the catalyst obtained from three catalytic components of the present invention. Namely, the transition metal compound is reacted with the metal compound reducing agent in the absence of the unsaturated hydrocarbon in an inert solvent at a temperature above 0° C., the reaction product is very unstable and must be used as the catalyst as soon as possible. Otherwise, the activity as the hydrogenation catalyst decreases rapidly. This tendency becomes more and more conspicuous as the mixing temperature becomes higher and is most remarkable when the aluminium containing reducing agent and the organic compound of which organic radicals are attached to the metal through oxygen are used. For example, the reaction product obtained by mixing nickel naphthenate with triethylaluminium in toluene at 80° C. had activity too low to be used as the hydrogenation catalyst after 1 hour. On the contrary, the three component catalyst of the present invention maintains unusually high activity for a long time (more than 1 hour).

As the temperature is higher, the viscosity of the polymer solution decreases remarkably and hydrogen can contact with the polymer solution more easily, and then the reaction rate of the hydrogenation becomes faster. Therefore, in the case of the hydrogenation of polymers in a viscous solution form, it is preferable to effect the hydrogenation at a higher temperature than 0° C., so far as the degradation of the polymeric chain does not occur substantially. However, when the transition metal compound is mixed with the metal compound reducing agent in an inert solvent without adding the unsaturated hydrocarbon at a temperature below 0° C., the obtained reaction product has activity as the hydrogenation catalyst, but the activity decreases if the reaction product is heated at high temperature above 0° C. before it is mixed with the polymer solution.

On the contrary, the three components catalyst of the present invention maintains unusually high activity even when it is heated at a high temperature suitable for the hydrogenation of polymers. Such stable catalyst at a high temperature is especially suitable for the hydrogenation of polymers in a viscous solution form. These merits make the present invention more valuable in industrial applications, especially in continuous hydrogenation process.

The mole ratios of the transition metal compound to the metal compound reducing agent or to the olefinically or acetylenically unsaturated bond of the unsaturated hydrocarbon may be varied widely. The mole ratios of the transition metal compound to the metal compound reducing agent of from 1:02.2 to 1:10 may be preferably used. When the molar ratio is below 1:10 or above 1:0.2, the decrease of the activity as the hydrogenation catalyst is observed. Ratios of from 1:0.2 to 1:8 are more preferably used. The mole ratios of the transition metal compound to the olefinically or acetylenically unsaturated bond of the unsaturated hydrocarbon of from 1:0.1 to 1:100 may be preferably employed. The use of an excess amount of the unsaturated hydrocarbon cause the undesirable induction period due to the auxiliary reaction in the catalyst formation and also cause unnecessary consumption of hydrogen in the hydrogenation of polymers. To avoid such phenomena, the mole ratios of from 1:0.1 to 1:50 are more preferably used. Usually, the stable catalyst with unusually high activity can be obtained by using the same molar quantity of the unsaturated hydrocarbon to the transition metal compound. According to the present invention, the concentration of nickel, cobalt or iron of the catalyst may be 0.1 mmol or more per a liter of polymer solution to be hydrogenated.

As an inert solvent used for preparing the catalyst or dissolving the polymers to be hydrogenated, saturated hydrocarbon, aromatic hydrocarbon, hydroaromatic hydrocarbon, chlorinated aromatic hydrocarbon and ether may be used. Example of such inert solvents include hexane, heptane, octane, benzene, toluene, xylene, cyclohexane, methylcyclohexane, decalin, tetralin, chlorobenzene, tetrahydrofuran, anisole, dioxane and their mixtures. Among them saturated hydrocarbon, aromatic hydrocarbon and hydroaromatic hydrocarbon are preferably used.

The catalyst of the present invention is used for the hydrogenation of the unsaturated bonds of polymers in a viscous solution form. The hydrogenatable unsaturated bonds according to the present invention include carbon-carbon double bond, carbon-carbon triple bond and carbon-nitrogen triple bond. Diene polymers having such hydrogenatable unsaturated bonds are preferably employed in the present invention. Such diene polymers include homopolymer and copolymer of conjugated diene, and copolymer of conjugated diene and unsaturated compound which can copolymerize with conjugated diene such as vinylsubstituted aromatic hydrocarbon. Examples of such polymers include polybutadiene, polyisoprene, butadiene-styrene copolymer, butadiene-$\alpha$-methylstyrene copolymer, butadiene-isoprene copolymer, polybutadiene grafted with a minor amount of styrene, butadiene-acrylonitrile copolymer, butadiene-vinylpyridine copolymer and others. These polymers may be prepared by bulk polymerization, solution polymerization or emulsion polymerization by the use of radical type initiator, ionic type initiator or Ziegler type initiator. The polymers having Mooney viscosity at 100° C. of more than 20 can be easily hydrogenated according to the present invention. The hydrogenated polymers obtained from polymers having such a high Mooney viscosity are useful for manufacturing rubber articles.

The catalyst of the present invention has so high activity for the hydrogenation of olefinically unsaturated bonds of polymers that the complete hydrogenation can be carried out unde the mild condition, for example, under atmospheric pressure of hydrogen and at near the room temperature in a short time. Further, the aromatic nuclei can be hydrogenated under more severe condition. The pressure of hydrogen used in the hydrogenation may be varied widely, but the selective hydrogenation of olefinically unsaturated bonds can be carried out at a temperature of from 0° to 120° C. and under a hydrogen pressure of less than 10 atms. It is one of merits of the present invention that the selective hydrogenation of the unsaturated bonds of polymers proceeds easily in a viscous solution form in high activity.

According to the invention, the concentration of polymers in a solution to be hydrogenated may be varied from 1 to 30 percent, preferably from 1 to 25 percent. The viscosity of the polymer solution may be varied widely. From 0.05 to 5,000 poise, preferably from 1 to 2,000 poise, may be employed. As is shown in the following example, it is surprising that the hydrogenation of the polymer solution having a viscosity of about 200 poise proceeds at room temperature and under atmospheric pressure of hydrogen. This fact shows that the hydrogenation efficiency of the catalyst obtained according to the invention is excellent. This is one of merits of the present invention.

After hydrogenation, the solvent and catalysts can be easily removed from the hydrogenated polymers by adding polar solvent, such as, acetone and alcohol to the reaction mixtures and precipitating the polymers, or pouring the reaction products into a steam or a hot water and removing solvent by azeotropic distillation. In these procedures, the catalysts are decomposed and the major part of them is removed from the polymers, but the most effective removal of the catalysts is attained by contacting the reaction mixtures with polar solvent or water containing a small amount of acid.

According to the present invention, polymers of high Mooney viscosity even more than 40 can be easily hydrogenated under such a mild condition that side reaction such as thermal degradation or gelation does not occur, so that the obtained polymers have no undesired properties resulting from the decrease of molecular weight or gel. Therefore, the hydrogenated polymers of the present invention have the improved properties and do not lose various good properties of the starting polymers.

For example, the hydrogenated styrene-butadiene random copolymer has higher green strength, resilience, oil extendability and heat resistance than the starting styrenebutadiene copolymer. This hydrogenated polymer has also property of roll processability, extrusion or high filler loading. The hydrogenated polybutadiene obtained by the process of the invention has improved green strength, less cold flow property and others.

These hydrogenated polymers of the present invention are easily curable by the conventional procedure and may be applied to the production of rubber articles.

The invention is illustrated in the greater detail in the following examples which are not intended, however, to be unduly limitative of the invention.

EXAMPLE 1

In a shakable glass reactor of 300 millilitres capacity, 100 millilitres of 5 weight percent toluene solution of solution-polymerized styrene-butadiene random copolymer (styrene/butadiene=21/79, ML-4 at 100° C.:45) was placed. After the atmosphere of the reactor was displaced by hydrogen, pre-prepared catalyst was added to the polymer solution and then the atmospheric pressure of hydrogen was contacted with the solution under shaking at 30° C. and an amount of hydrogen absorbed was measured continuously by gas burette.

The catalyst was prepared in toluene by mixing 0.8 millimole of nickel naphthenate with 2.4 millimoles of triethylaluminium at 30° C. under nitrogen or hydrogen in the presence of 0.8 millimole of styrene, 1,7-octadiene or cyclohexene. After 5 minutes, the catalyst solution containing 0.4 millimole of nickel was weighed out from the catalyst solution obtained by the above described procedure and then mixed with the polymer solution. Further, the same hydrogenation was repeated by the use of the two components catalyst obtained by reacting nickel naphthenate with triethylaluminium under the same condition used to prepare the three components catalyst.

The viscosity of the polymer solution containing the three components catalyst was about 1.2 poises at the temperature at which the hydrogenation was carried out.

When the three components catalyst was used, it was observed that hydrogen was absorbed rapidly as soon as the catalyst was mixed with the polymer solution. After 1 hour, the introduction of hydrogen was stopped and under stirring a small amount of acetone containing hydrocloric acid was added to the polymer solution and then the solution was mixed with a large amount of acetone to precipitate the polymer. White rubbery hydrogenated polymer having a high tensile strength was obtained after drying under reduced pressure.

The infrared spectrum of obtained hydrogenated polymers show peaks at 721 cm.$^{-1}$ and 1,380 cm.$^{-1}$ assigned to —$(CH_2)_4$— and —$CH_3$ of butadienic unit saturated with hydrogen respectively, peaks at 967 cm.$^{-1}$ and 910 cm.$^{-1}$ assigned to trans-1,4-configuration and vinyl radical of butadienic unit respectively and peaks at 699 cm.$^{-1}$ and 757 cm.$^{-1}$ assigned to phenyl radical of styrenic unit, and no peaks in the range of from 820 to 900 cm.$^{-1}$ assigned to cyclohexyl radical. These facts shows that the selective hydrogenation of olefinically unsaturated bonds of the polymer was carried out.

The amount of hydrogen absorbed in 10, 30 and 60 minutes and the required time for absorbing the same quantity of hydrogen absorbed in 1 hour when the two components catalyst was used, are shown in Table 1.

TABLE 1

| Olefinically unsaturated hydrocarbon | Amount of hydrogen absorbed, ml. | | | Required time, min. |
|---|---|---|---|---|
| | 10 min. | 30 min. | 60 min. | |
| None | 252 | 536 | 695 | |
| Styrene | 575 | 1014 | 1219 | 13 |
| Cyclohexene | 715 | 1258 | 1445 | 9.5 |
| 1,7-octadiene | 766 | 1235 | 1389 | 9 |
| 1,7-octadiene [1] | 53 | 155 | 280 | |

[1] The catalyst was prepared in an atmosphere of hydrogen.

In this example and the following Examples of 2 to 10 (except Example 5), the butadienic units of the styrene-butadiene randon copolymer are hydrogenated completely by about 1,670 milliliters of hydrogen. The Table 1 shows, for example, that 86.6 percent of the butadienic units of the polymer was hydrogenated in 1 hour by the three components catalyst prepared in the presence of cyclohexene.

These results show that the three components catalysts prepared under an atmosphere of nitrogen are from 4 to 6 times effective compared with the two components catalyst in the hydrogenation of the polymer in a viscous solution form.

EXAMPLE 2

The same hydrogenation as shown in Example 1 was carried out at 29° C. by using the catalyst obtained from cobalt compound.

The catalyst was prepared in toluene by mixing 0.21 gram of cobalt acetylacetonate with 2.4 millimoles of triethylaluminium at 29° C. under nitrogen in the presence or absence of 0.8 millimole of styrene or cyclohexene. After 5 minutes, the catalyst solution containing 0.4 millimole of cobalt was weighed out and mixed with the polymer solution.

The amount of hydrogen absorbed in 10, 30 and 60 minutes and the required time for absorbing such a quantity of hydrogen that the two components catalyst absorbed in 1 hour, are shown in Table 2.

TABLE 2

| Olefinically unsaturated hydrocarbon | Amount of hydrogen absorbed, ml. | | | Required time, min. |
|---|---|---|---|---|
| | 10 min. | 30 min. | 60 min. | |
| None | 268 | 357 | 396 | |
| Styrene | 334 | 441 | 497 | 19 |
| Cyclohexene | 438 | 583 | 639 | 8 |

EXAMPLE 3

The same hydrogenation as shown in Example 1 was carried out at 30° C. by using the catalyst obtained from iron compound.

The catalyst was prepared in toluene by mixing 0.8 millimole of iron naphthenate with 2.4 millimoles of triethylaluminium at 30° C. under nitrogen in the presence or absence of 0.8 millimole of 1-heptene 2-methylbutene-1, 1,7-octadience or cyclohexene. After 5 minutes, the catalyst solution containing 0.4 millimole of iron was weighed out and mixed with the polymer solution.

The amount of hydrogen absorbed in 10, 30 and 60 minutes is shown in Table 3.

TABLE 3

| Olefinically unsaturated hydrocarbon | Amount of hydrogen absorbed, ml. | | |
|---|---|---|---|
| | 10 min. | 30 min. | 60 min. |
| None | 7 | 27 | |
| 1-heptene | 58 | 116 | 138 |
| 2-methylbutene-1 | 142 | 240 | 286 |
| 1,7-octadiene | 163 | 280 | 337 |
| Cyclohexene | 484 | 965 | 1096 |

These results show that iron catalyst, which was not used as the hydrogenation catalyst because of its inferior activity, can be activated usually by the process of the present invention.

EXAMPLE 4

In a shakable glass reactor of 300 ml. capacity equipped with a jacket, through which water is circulated, 100 ml. of 5 weight percent solution of solution-polymerized styrene-butadiene copolymer (styrene/butadiene 18/82, ML-4 at 100° C.:45) in toluene was hydrogenated at 80° C. in the same manner as shown in Example 1. The catalyst was prepared in toluene by mixing benzene sulfonate or p-toluene sulfonate of nickel with triethylaluminium in the presence of dicyclopentadiene at 80° C. and keeping the reaction mixtures at 80° C. for 30 minutes under an atmosphere of nitrogen. The results are shown in Table 4.

TABLE 4

| Nickel salt | AlEt₃/unsaturated bonds of dicyclopentadiene/Ni-salts, mole ratio | Catalyst conc., mmol/l. | Amount of hydrogen absorbed, ml. | | |
|---|---|---|---|---|---|
| | | | 10 min. | 30 min. | 60 min. |
| Benzene sulfonate | 4/2/1 | 4 | 582 | 786 | 897 |
| p-Toluene sulfonate | 3/2/1 | 3 | 440 | 622 | 686 |

EXAMPLE 5

In the same reactor as shown in Example 4, 100 milliliters of 5 weight percent toluene solution of solution-polymerized polybutadiene (cis-1,4-configuration: 35%, trans-1.4: 55%, 1.2: 10%, ML-4 at 100° C.:35) was placed. The hydrogenation was carried out at 50° C. in the same manner as shown in Example 1.

The catalyst was prepared in toluene by mixing 0.4 millimole of nickel naphthenate with 1.6 millimoles of diethylmagnesium at a constant temperature under nitrogen in the presence of 0.4 millimole of dicyclopentadiene of styrene. After keeping the reaction mixtures at the constant temperature for 5 minutes, the catalyst solution containing 0.3 millimole of nickel was weighed out and mixed with the polymer solution.

The amount of hydrogen absorbed in 10, 30 and 60 minutes is shown in Table 5.

TABLE 5

| Olefinically unsaturated hydrocarbon | Temperature of catalyst preparation, °C. | Amount of hydrogen absorbed, ml. | | |
|---|---|---|---|---|
| | | 10 min. | 30 min. | 60 min. |
| Dicyclopentadiene | 60 | 736 | 1574 | 1972 |
| Do | 40 | 480 | 1586 | 1988 |
| Do | 25 | 205 | 1314 | 1897 |
| Styrene | 25 | 401 | 1422 | 1840 |

After 1 hour, the introduction of hydrogen was stopped and the hydrogenated polybutadiene was recovered. The infrared spectrum of the hydrogenated polybutadiene obtained by the use of the three components catalyst shows peaks at 721 cm.⁻¹ and 1,380 cm.⁻¹ assigned to

—(CH₂)₄— and —CH₃ of butadienic units saturated with hydrogen respectively.

In this example, the butadienic units of the polybutadiene are hydrogenated completely by about 2,100 milliliters of hydrogen.

EXAMPLE 6

The same hydrogenation as shown in Example 1 was carried out at 30° C. by using the catalyst obtained from n-butyllithium.

The catalyst was prepared in toluene by mixing 0.6 millimole of nickel naphthenate with 2.3 milliliters of hexane solution containing 1.8 millimoles of n-butyllithium at 50° C. under nitrogen in the presence of 0.6 millimole of styrene or 1,7-octadiene. After keeping the reaction mixtures at 50° C. for 5 minutes, the catalyst solution containing 0.4 millimole of nickel was weighed out and mixed with the polymer solution.

The amount of hydrogen absorbed in 10, 30 and 60 minutes are shown in Table 6.

EXAMPLE 7

The same hydrogenation as shown in Example 1 was carried out at 30° C. by using the catalyst obtained from lithiumaluminiumhydride.

TABLE 6

| Olefinically unsaturated hydrocarbon | Amount of hydrogen absorbed, ml. | | |
|---|---|---|---|
| | 10 min. | 30 min. | 60 min. |
| Styrene | 212 | 530 | 709 |
| 1,7-octadiene | 484 | 903 | 1010 |

The catalyst was prepared in toluene by mixing 0.8 millimole of nickel naphthenate with 10 milliliters of tetrahydrofuran solution containing 0.122 grams of lithium-aluminiumhydride at 50° C. under nitrogen in the presence of 0.8 millimole of 1,7-octadiene, 1-heptene or cyclohexene. After keeping the reaction mixtures at 50° C. for 5 minutes, the catalyst solution containing 0.4 millimole of nickel was weighed out and mixed with the polymer solution.

The amount of hydrogen absorbed in 10, 30 and 60 minutes is shown in Table 7.

TABLE 7

| Olefinically unsaturated hydrocarbon | Amount of hydrogen absorbed, ml. | | |
|---|---|---|---|
| | 10 min. | 30 min. | 60 min. |
| 1,7-octadiene | 760 | 1369 | 1552 |
| 1-heptene | 748 | 1456 | 1659 |
| Cyclohexene | 754 | 1489 | 1697 |

EXAMPLE 8

The same hydrogenation as shown in Example 1 was carried out at 24° C.

The catalyst was prepared in toluene by mixing 1.2 millimoles of nickel naphthenate with 3.6 millimoles of triethylaluminium at 80° C. under nitrogen in the presence or absence of 1.2 millimoles of dicyclopentadiene or ethylacetylene. After keeping the reaction mixtures at 80° C. for 5 and 60 minutes, the catalyst solution containing 0.4 millimole of nickel was weighed out and mixed with the polymer solutions. Another catalyst, in which ethylacetylene was used and the mole ratio of nickel naphthenate to ethylacetylene was 2, was also prepared.

The amount of hydrogen absorbed in 10, 30 and 60 minutes is shown in Table 8.

TABLE 8

| Olefinically or acetylenically unsaturated hydrocarbon | Olefinically or acetylenically unsaturated bond of the unsaturated hydrocarbon/Ni, mole ratio | Time of keeping the catalyst at 80° C., min. | Amount of hydrogen absorbed, ml. | | |
|---|---|---|---|---|---|
| | | | 10 min. | 30 min. | 60 min. |
| None | | 0 | 16 | 43 | 75 |
| Do | | 60 | 0 | 3 | 9 |
| Dicyclopentadiene | 2 | 5 | 320 | 661 | 838 |
| Do | 2 | 60 | 256 | 673 | 877 |
| Ethylacetylene | 1 | 5 | 412 | 894 | 1083 |
| Do | 1 | 60 | 213 | 670 | 906 |
| Do | 2 | 5 | 476 | 1128 | 1330 |

These results show that the catalyst according to the present invention maintains high activity for a long time, even when the temperature of the catalyst preparation is high.

EXAMPLE 9

The same hydrogenation as shown in Example 1 was carried out at 28° C. by using the catalyst containing various quantities of dicyclopentadiene.

The catalyst was prepared in toluene by mixing 0.6 millimole of nickel naphthenate with 1.8 millimoles of triethylaluminium at 28° C. under nitrogen in the presence or absence of dicyclopentadiene. After 5 minutes, the catalyst solution containing 0.4 millimole of nickel was weighed out and mixed with the polymer solution.

The amount of hydrogen absorbed in 10, 30 and 60 minutes is shown in Table 9.

TABLE 9

| Olefinically unsaturated hydrocarbon | Olefinically unsaturated bond of unsaturated hydrocarbon/Ni, mole ratio | Amount of hydrogen absorbed, ml. | | |
|---|---|---|---|---|
| | | 10 min. | 30 min. | 60 min. |
| None | | 155 | 333 | 469 |
| Dicyclopentadiene | 1 | 794 | 1372 | 1554 |
| Do | 2 | 929 | 1527 | 1671 |
| Do | 4 | 891 | 1486 | 1643 |
| Do | 10 | 838 | 1465 | 1616 |
| Do | 20 | 272 | 1454 | 1639 |
| Do | 200 | 181 | 1134 | 2320 |

These results show that the quantities of the olefinically unsaturated hydrocarbon to be used can be varied widely. But, in the case of the mole ratio being 200, the undesirable induction period of the catalyst formation and unnecessary consumption of hydrogen were observed.

EXAMPLE 10

The same hydrogenation as shown in Example 1 was carried out at 30° C. by using the catalyst prepared by different mixing order of the catalytic components as shown in the following table.

The catalyst was prepared by mixing 0.8 millimole of nickel naphthenate, 2.4 millimoles of triethylaluminium and 0.8 millimole of styrene in toluene at 30° C. under nitrogen. After 5 minutes, the catalyst solution containing 0.4 millimole of nickel was weighed out and mixed with the polymer solution.

The amount of hydrogen absorbed in 10, 30 and 60 minutes is shown in Table 10.

TABLE 10

| Mixing order | Olefinically unsaturated bond of styrene/Ni, mole ratio | Amounts of hydrogen absorbed, ml. | | |
|---|---|---|---|---|
| | | 10 min. | 30 min. | 60 min. |
| Ni-naphthenate-AlEt₃ | | 237 | 366 | 448 |
| Ni-naphthenate-AlEt₃-styrene | 1 | 117 | 231 | 350 |
| Styrene-Ni-naphthenate-AlEt₃ | 1 | 472 | 914 | 1113 |

These results show that the catalyst with high activity can be obtained by mixing nickel naphthenate with triethylaluminium in the presence of styrene when the temperature of catalyst preparation is 30° C.

EXAMPLE 11

In the same reactor as used in Example 4, 100 milliliters of 2 volume percent n-hexane solution of cis-1,4-polyisoprene (cis-1,4 configuration: 92%, trans-1,4: 3%, 3,4: 5%, ML-4 at 100° C.:58) was placed. The hydrogenation was carried out at 50° C. in the same manner as shown in Example 1.

The catalyst was prepared in n-hexane by mixing 0.4 millimole of nickel naphthenate with 0.8, 1.2, 1.6 or 2.0 millimoles of triethylaluminium at 40° C. under nitrogen in the presence of 0.4 millimole of dicyclopentadiene. After 5 minutes, the catalyst solution containing 0.3 millimole of nickel was weighed out and mixed with the polymer solution. Further, the catalyst consisting of the two components without containing dicyclopentadiene was prepared by the same procedure as described above, and in this case 1.2 millimoles of triethylaluminium were used.

The amount of hydrogen absorbed in 60 minutes is shown in Table 11. In this example, unsaturated bonds of cis-1,4-polyisoprene are hydrogenated completely by about 658 milliliters of hydrogen.

Table 11

| AlEt₃/Ni-naphthenate (mole ratio) | Amount of hydrogen absorbed (ml.) |
|---|---|
| 2 | 315 |
| 3 | 473 |
| 3 [1] | 56 |
| 4 | 348 |
| 5 | 282 |

[1] Without containing dicyclopentadiene.

EXAMPLE 12

In a glass reactor equipped with a strong stirrer suitable for the hydrogenation of highly viscous solution, a highly concentrated solution of solution-polymerized styrene-butadiene random copolymer (styrene/butadiene 25/75, ML-4 at 100° C.:45) in toluene was placed. The hydrogenation was carried out at room temperature and under an atmospheric pressure.

The catalyst was prepared in toluene under an atmosphere of nitrogen by mixing nickel naphthenate with triethylaluminium in the presence of dicyclopentadiene at 25° C. for 5 minutes, wherein the mole ratios of nickel naphthenate to triethylaluminium and to unsaturated bonds of dicyclopentadiene were 1:1.5 or 1:3 and 1:2 respectively. The concentration of the catalyst was 3 mmol of nickel per liter of the polymer solution. The results are shown in Table 12.

TABLE 12

| Polymer concentration, volume percent | Viscosity, poise | AlEt₃/Ni-naphthenate, mole ratio | Reaction time, hours | Degree of hydrogenation,[1] percent |
|---|---|---|---|---|
| 10 | 6.7 | 1.5 | 1 | 52 |
| 15 | 47 | 3 | 1.5 | 43 |
| 20 | 214 | 3 | 1.5 | 12 |

[1] Degree of hydrogenation is based upon the theoretical value of 100 percent for the completely hydrogenated polymer.

EXAMPLE 13

In the same reactor as used in Example 1, 100 milliliters of 3.5 volume percent toluene solution of solution-polymerized styrene-butadiene random copolymer (styrene/butadiene=18/82, ML-4 at 100° C.:45) was placed. The hydrogenation was carried out at room temperature in the same manner as shown in Example 1.

The catalyst was prepared in toluene under nitrogen by mixing 0.6 millimole of the following nickel or cobalt compound with 1.8 millimoles of triethylaluminium at —78° C. for 5 minutes, adding 0.6 millimole of dicyclopentadiene to the obtained reaction product at —78° C. and raising the temperature up to 40° C. After keeping at 40° C. for 60 minutes, the catalyst solution containing 0.4 millimole of nickel or cobalt was weighed out and mixed with the polymer solution. Further, the catalyst consisting of the two components without adding dicyclopentadiene was prepared by the same procedure as in the case of cobalt naphthenate.

The amount of hydrogen absorbed in 10, 30 and 60 minutes is shown in Table 13.

TABLE 13

| Nickel or cobalt compound | Amount of hydrogen absorbed, ml. | | |
|---|---|---|---|
|  | 10 min. | 30 min. | 60 min. |
| Bis(salicylaldehyde)nickel | 137 | 541 | 783 |
| Nickel cyclohexylcarboxylate | 592 | 815 | 940 |
| Cobalt octanoate | 518 | 644 | 696 |
| Cobalt naphthenate | 486 | 605 | 667 |
| Cobalt naphthenate [1] | 0 | 0 | 3 |

[1] Without adding dicyclopentadiene.

EXAMPLE 14

In the same reactor as used in Example 4, 100 milliliters of 5 weight percent toluene solution os solution-polymerized styrene-butadiene random copolymer (styrene/butadiene=24/76, ML-4 at 100° C.:45) was placed. The hydrogenation was carried out at 80° C. in the same manner as shown in Example 1.

The catalyst was prepared in toluene under nitrogen by mixing 0.8 millimole of nickel naphthenate with 2.4 millimoles of triethylaluminium at —78° C. for 5 minutes, adding 0.8 millimole of olefinically unsaturated hydrocarbon to the obtained reaction product at —78° C. and then raising the temperature up to 40° C. After keeping at 40° C. for 30 minutes, the catalyst solution containing 0.2 millimole of nickel was weighed out and mixed with the polymer solution. Further, the catalyst consisting of the two components without adding the olefinically unsaturated hydrocarbon was prepared by the same procedure as described above.

The amount of hydrogen absorbed in 10, 30 and 60 minutes is shown in Table 14.

TABLE 14

| Olefinically unsaturated hydrocarbon | Amount of hydrogen absorbed, (ml.) | | |
|---|---|---|---|
|  | 10 min. | 30 min. | 60 min. |
| 1,7-octadiene | 874 | 1,088 | 1,182 |
| 1,3-cyclooctadiene | 845 | 1,040 | 1,131 |
| Dicyclopentadiene | 810 | 1,015 | 1,109 |
| Styrene | 1,001 | 1,229 | 1,371 |
| Isoprene | 952 | 1,151 | 1,234 |
| 1,3-pentadiene | 933 | 1,095 | 1,185 |
| 2-methylbutene-1 | 760 | 948 | 1,029 |
| None | 249 | 468 | 589 |

These results show that the three components catalyst of the present invention maintains high activity of the catalyst even if it is heated at 40° C. for a long period of time.

EXAMPLE 15

The same hydrogenation as shown in Example 14 was carried out at 80° C. by using the different catalyst.

The catalyst was prepared in toluene under nitrogen by mixing 0.8 millimole of nickel naphthenate with 2.4 millimoles of triethylaluminium at —78° C. for 5 minutes. After the procedure described in the following table, the catalyst solution containing 0.2 millimole of nickel was weighed out and mixed with the polymer solution. In Exp. No. 4, the catalyst, which had been prepared by mixing the nickel naphthenate with the triethylaluminium at —78° C. for 5 minutes, was maintained at —78° C. until it was mixed with the polymer solution. In Exp. No. 5, the catalyst prepared by mixing the nickel naphthenate with the triethylaluminium at 40° C. for 5 minutes was used.

The amount of hydrogen absorbed in 10, 30 and 60 minutes is shown in Table 15.

TABLE 15

| Exp. No. | Procedure | Amount of hydrogen absorbed, ml. | | |
|---|---|---|---|---|
|  |  | 10 min. | 30 min. | 60 min. |
| 1 | Mixed with 0.8 mmol of ethylacethylene at —78° C | 929 | 1,098 | 1,211 |
| 2 | After mixed with 0.8 mmol ethylacetylene, kept at —78° C. for 30 min | 1,001 | 1,172 | 1,260 |
| 3 | After mixed with 0.8 mmol of ethylacetylene, kept at 40° C. for 30 min | 1,025 | 1,181 | 1,289 |
| 4 |  | 930 | 1,108 | 1,215 |
| 5 |  | 129 | 278 | 355 |

These results show that the catalyst having a high activity can be obtained by mixing the nickel naphthenate with triethylaluminium at a low temperature and keeping the reaction product at the low temperature until it is mixed with the polymer solution, and the high activity can be maintained at high temperature by adding acetylenically unsaturated hydrocarbon to the reaction product of nickel naphthenate with triethylaluminium.

EXAMPLE 16

The same hydrogenation as shown in Example 14 was carried out at 80° C. by using the different catalyst.

The catalyst was prepared in toluene under nitrogen by mixing 0.8 millimole of a nickel compound with 2.4 millimoles of an organometallic compound at —78° C. for 5 minutes, adding 0.8 millmole of styrene to the obtained reaction product at —78° C. and then raising the temperature up to 40° C. After keeping at 40° C. for 30 minutes, the catalyst solution containing 0.2 millimole of nickel was weighed out and mixed with the polymer solution.

The amount of hydrogen absorbed in 10, 30 and 60 minutes is shown in Table 16.

TABLE 16

| Nickel compound | Organometallic compound | Amount of hydrogen absorbed, ml. | | |
|---|---|---|---|---|
|  |  | 10 min. | 30 min. | 60 min. |
| Nickel naphthenate | n-Butyllithium | 802 | 1,069 | 1,182 |
| bis(acetylacetone) nickel. | do | 651 | 981 | 1,038 |
| Nickel naphthenate | Diethylmagnesium | 936 | 1,281 | 1,425 |
| Bis(acetylacetone) nickel. | do | | 1,024 | 1,209 |

EXAMPLE 17

In the same reactor as used in Example 4, 100 milliliters of toluene solution containing 5 grams of polybutadiene (cis-1,4 configuration: 35%, trans-1.4: 55%, 1.2: 10%, ML–4 at 100° C:35) was placed. The hydrogenation was carried out at 80° C. in the same manner as shown in Example 1.

The catalyst was prepared in toluene under nitrogen by mixing 0.8 millimole of nickel naphthenate with 2.4 millimoles of triethylaluminium at −78° C. for 5 minutes, adding 0.8 millimole of olefifnically unsaturated hydrocarbon to the obtained reaction product at −78° C. and then raising the temperature up to 40° C. After keeping at 40° C. for 30 minutes, the catalyst solution containing 0.2 millimole of nickel was weighed out and mixed with the polymer solution.

The amount of hydrogen absorbed in 10, 30 and 60 minutes is shown in Table 17.

TABLE 17

| Olefinically unsaturated hydrocarbon | Amount of hydrogen absorbed, ml. | | |
|---|---|---|---|
| | 10 min. | 30 min. | 60 min. |
| 1,3-pentadiene | 921 | 1320 | 1521 |
| Isoprene | 872 | 1269 | 1442 |
| 1,7-octadiene | 784 | 1200 | 1390 |
| 1,3-cyclooctadiene | 759 | 1181 | 1346 |

EXAMPLE 18

In a mechanically stirred autoclave, 8 weight percent solution of purified emulsion-polymerized styrenebutadiene random copolymer (styrene/butadiene=23/77, ML–4 at 100° C.:52) in toluene was catalytically hydrogenated. The catalyst was prepared by mixing nickel naphthenate with triethylaluminium in the presence of 1,7-octadiene at 40° C. for 5 minutes, wherein the mole ratios of nickel naphthenate to triethylaminium and to the unsaturated bonds of 1,7-octadiene were 1:3 and 1:2 respectively. The concentration of the catalyst was 3 millimoles of nickel per liter of the polymer solution to be hydrogenated.

The hydrogenated polymer was recovered and the degree of hydrogenation based upon the theoretical value of 100 percent for the completely hydrogenated polymer was 21.2. The compounding recipe and physical properties of the hydrogenated and the original polymer are summerized in Table 18.

These results show that the green strength of the obtained hydrogenated polymer was about ten times of the original polymer even when 100 phr. of oil and 100 phr. of carbon black were compounded and tensile strength after cured was almost the same, besides no decrease of tensile strength was observed after aged at 110° C. for 24 hours.

TABLE 18

| | Original styrene-butadiene random copolymer | Hydrogenated styrene-butadiene random copolymer |
|---|---|---|
| Degree of hydrogenation | | 85 |
| Polymer | 100 | 100 |
| Carbon black ISAF [1] | 50 | 100 |
| Zinc oxide | 5 | 5 |
| Stearic acid | 1 | 1 |
| Hitanol 1501 [2] | 5 | 5 |
| Antioxidant D | 1 | 1 |
| Aromatic oil | 10 | 100 |
| Nocceler MSA [3] | 1 | 1 |
| Sulphur | 2 | 2 |
| Green strength, kg./cm.[2] | 3 | 30 |
| *After cured at 150° C.×45 minutes* | | |
| Hardness | 59 | 55 |
| Elongation, percent | 460 | 600 |
| 300% modulus, kg./cm.[2] | 117 | 75 |
| Tensile strength, kg./cm.[2] | 210 | 200 |
| *After aged air heated at 110° C.×24 hours* | | |
| Elongation | 250 | 510 |
| 300% modulus, kg./cm.[2] | | 102 |
| Tensile strength, kg./cm.[2] | 180 | 200 |

[1] Abbreviation of Intermediate Super Abrasion Furnace.
[2] Commercial name of novolac type alkyl phenol formaldehyde resin.
[3] Commercial name of N-oxydiethylene-2-benzothiazole sulfenamide.

EXAMPLE 19

In a mechanically stirred autoclave, 7 volume percent solution of solution-polymerized styrene-butadiene random copolymer (styrene/butadiene=25/75, ML–4 at 100° C.:45) in toluene was catalytically hydrogenated. The catalyst was prepared by mixing nickel naphthenate with triethylaluminium in the presence of 1,7-octadiene at 40° C. for 5 minutes, wherein the mole ratios of nickel naphthenate to triethylaluminium and to the unsaturated bonds of 1,7-octadiene were 1:3 and 1:2 respectively. The concentration of nickel of the catalyst was 3 millimoles per liter of the polymer solution to be hydrogenated.

Thus, hydrogenated styrene-butadiene random copolymers having various degrees of hydrogenation were prepared. The compounding recipe and physical properties of the hydrogenated and the original polymer are summerized in Table 19.

TABLE 19

| | Original styrene/butadiene random copolymer | Hydrogenated styrene/butadiene random copolymer | | |
|---|---|---|---|---|
| Degree of hydrogenation | | 38.0 | 61.5 | 77.0 |
| Polymer | 100 | | | |
| Carbon black ISAF | 45 | | | |
| Aromatic oil | 10 | | | |
| Zinc oxide | 5 | | | |
| Stearic acid | 2 | | | |
| Antioxidant D | 1 | | | |
| Nocceler MSA [1] | 1 | | | |
| Sulphur | 2 | | | |
| Green strength, kg./cm.[2] | 4 | 17 | 88 | 190 |
| *After cured at 145° C.×1.5 times of the best cure time* | | | | |
| 300% modulus, kg./cm.[2] | 102 | 125 | 185 | 216 |
| Tensile strength, kg./cm.[2] | 123 | 201 | 222 | 279 |
| Resilience, percent [2] | 48.6 | 56.2 | 58.0 | 54.3 |

[1] Commercial name of N-oxydiethylene-2-benzothiazole sulfenamide.
[2] Measured by Dunlop method at 26° C.

These results show that tensile strength and resilience of the styrene-butadiene random copolymer were improved by the hydrogenation of its butadienic units.

EXAMPLE 20

In a high speed stirred 4 liters glass reactor connected to a gas burette, a solution containing 100 grams of cis-1,4-polybutadiene (cis-1,4 configuration:96.2%, trans-1,4:2.8%, 1,2:1%, ML–4 at 100° C.:52) in toluene was catalytically hydrogenated to a degree of hydrogenation of less than 10 percent. The catalyst was prepared by mixing nickel naphthenate with triethylaluminium in the presence of dicyclopentadiene at 40° C. for 5 minutes, wherein the mole ratios of nickel naphthenate to triethylaluminium and the unsaturated bonds of dicylopentadiene were 1:3 and 1:2 respectively. The concentration of nickel of the catalyst was 1 millimole per liter of the polymer solution to be hydrogenated. Degree of hydrogenation was controlled by measuring an amount of hydrogen absorbed through gas burette and by stopping the hydrogenation when predetermined amount of hydrogen was absorbed. The hydrogenated polymers having different degree of hydrogenation were compared with the original polymer in their physical properties. The compounding recipe and physical properties are summerized in Table 20.

These results show that the green strength of the hydrogenated polymers was extremely higher than that of the original polymer in spite of a small degree of hydrogenation. These hydrogenated polymers did not show cold flow.

TABLE 20

|  | Original polybutadiene | Hydrogenated polybutadiene | | |
|---|---|---|---|---|
|  |  | A | B | C |
| Degree of hydrogenation, percent | 0 | 1 | 3 | 5 |
| Polymer | 100 | 1 | 3 | 5 |
| Carbon black ISAF | 50 | 1 | 3 | 5 |
| Zinc oxide | 3 | 1 | 3 | 5 |
| Stearic acid | 2 | 1 | 3 | 5 |
| Antioxidant D | 1 | 1 | 3 | 5 |
| Nocceler MSA | 0.8 | 1 | 3 | 5 |
| Sulphur | 1.8 | 1 | 3 | 5 |
| Aromatic oil | 10 | 1 | 3 | 5 |
| Hitanol 1501 | 3 | 1 | 3 | 5 |
| Green strength, kg./cm.² | 2 | 4 | 23 | 20 |
| After cured at 150° C.×30 minutes | | | | |
| Hardness | 54 | 54 | 58 | 63 |
| Elongation, percent | 670 | 670 | 600 | 540 |
| 300% modulus, kg./cm.² | 63 | 65 | 75 | 75 |
| Tensile strength, kg./cm.² | 193 | 210 | 200 | 180 |

What we claim is:

1. A process for the catalytic hydrogenation of a homopolymer of a conjugated diene or a copolymer of a conjugated diene and an unsaturated compound copolymerizable with a conjugated diene, which comprises reacting hydrogen with the hydrogenatable unsaturated bond of said polymer in a solution having a viscosity of from 0.05 to 5,000 poises at the temperature of said hydrogenation in an inert solvent selected from the group consisting of a saturated hydrocarbon, an aromatic hydrocarbon, a hydroaromatic hydrocarbon, a chlorinated aromatic hydrocarbon, an ether, and mixtures thereof, at a temperature of from 0° C. to 120° C. in the presence of a three component catalyst comprising (1) an unsaturated hydrocarbon selected from the group consisting of an olefinically unsaturated hydrocarbon having at least one olefinically unsaturated bond per 10 carbon atoms of the molecule and acetylenically unsaturated hydrocarbon having at least one acetylenically unsaturated bond per 10 carbon atoms of the molecule, (2) an organic compound selected from the group consisting of a metal carboxylate having the formula $(R'COO)_{n'}M'$, wherein $M'$ is a metal, $R'$ is a hydrocarbon radical having from 1 to 50 carbon atoms and $n'$ is the valence number of $M'$, a metal chelate compound of which chelate groups are β-ketones, hydrocarboxylic acids, β-hydrocarboxylic acids or β-hydrocarbonyl compounds, a metal sulfonate derived from benzene sulfonic acid, p-toluene sulfonic acid or alkyl-benzene sulfonic acid, wherein said metal is nickel, cobalt or iron and (3) a metal compound reducing agent selected from the group consisting of lithium aluminum hydride and an organometallic compound having the formula $MR_n$ wherein M is lithium, magnesium or aluminum, R is a hydrocarbon radical having from 1 to 12 carbon atoms, an alkoxy radical having from 1 to 12 carbon atoms, or hydrogen and $n$ is a valence number of M, said catalyst being prepared in said inert solvent under an inert atmosphere devoid of hydrogen either by mixing the components (2) and (3) in the presence of the component (1) at a temperature of from 0° C. to 100 °C. or by mixing the components (2) and (3) at a temperature of from −100° C. to 0° C. and then mixing the obtained reaction product with the component (1) at a temperature not higher than the temperature at which the component (2) has been mixed with the component (3), the molar ratio of the component (2) to said olefinically or acetylenically unsaturated bond of the component (1) being within the range of from 1:0.1 to 1:50, the molar ratio of the component (2) to the component (3) being within the range of from 1:0.2 to 1:10, the concentration of nickel, cobalt or iron dissolved in said catalyst being at least 0.1 mmol per litre of said solution.

2. The process as claimed in claim 1, wherein the carbon atoms of said unsaturated hydrocarbon are less than 20.

3. The process as claimed in claim 1, wherein said unsaturated hydrocarbon is a monoolefin.

4. The process as claimed in claim 1, wherein said unsaturated hydrocarbon is a diolefin.

5. The process as claimed in claim 1, wherein said unsaturated hydrocarbon is a polyolefin.

6. The process as claimed in claim 1, wherein said unsaturated hydrocarbon is a cycloolefin.

7. The process as claimed in claim 1, wherein said unsaturated hydrocarbon is an acetylene.

8. The process as claimed in claim 1, wherein said metal carboxylate is a metal naphthenate.

9. The process as claimed in claim 1, wherein said metal carboxylate is a metal octanoate.

10. The process as claimed in claim 1, wherein said metal carboxylate is a metal cyclohexylcarboxylate.

11. The process as claimed in claim 1, wherein said organometallic compound is an alkylaluminum.

12. The process as claimed in claim 1, wherein said organometallic compound is a dialkylmagnesium.

13. The process as claimed in claim 1, wherein said organometallic compound is an alkyllithium.

14. The process as claimed in claim 1, wherein said molar ratio of (2) to (3) is within the range of from 1:0.2 to 1:8.

15. The process as claimed in claim 1, wherein the pressure of said hydrogen is less than 50 atms.

16. The process as claimed in claim 1, wherein said conjugated diene polymer is a styrene-butadiene copolymer.

17. The process as claimed in claim 1, wherein said conjugated diene polymer is a polybutadiene.

18. The process as claimed in claim 1, wherein said conjugated diene polymer is a polyisoprene.

19. The process as claimed in claim 1, wherein said viscosity is within the range of from 1 to 2,000 poises.

20. The process as claimed in claim 1, wherein said β-ketone is acetylacetone.

21. The process as claimed in claim 1, wherein said β-ketone is ethylacetoacetate.

22. The process as claimed in claim 1, wherein said β-hydroxycarbonyl compound is salicycaldehyde.

23. The process as claimed in claim 1, wherein said alkylaluminum is triethylaluminum.

24. The process as claimed in claim 12, wherein said dialkylmagnesium is diethylmagnesium.

25. The process as claimed in claim 13, wherein said alkyllithium is n-butyllithium.

References Cited

UNITED STATES PATENTS

| | | | |
|---|---|---|---|
| 2,813,809 | 11/1957 | Jones et al. | 260—94.7 XR |
| 2,864,809 | 12/1958 | Jones et al. | 260—94.7 XR |
| 2,911,395 | 11/1959 | Small | 260—96 XR |
| 3,130,237 | 4/1964 | Wald | 260—85.1 XR |

JOSEPH L. SCHOFER, Primary Examiner

W. F. HAMROCK, Assistant Examiner

U.S. Cl. X.R.

252—429; 260—82.1, 83.3, 94.7, 96, 690